Dec. 13, 1949     R. J. VEDOVELL     2,491,233
SEAL
Filed Jan. 19, 1946
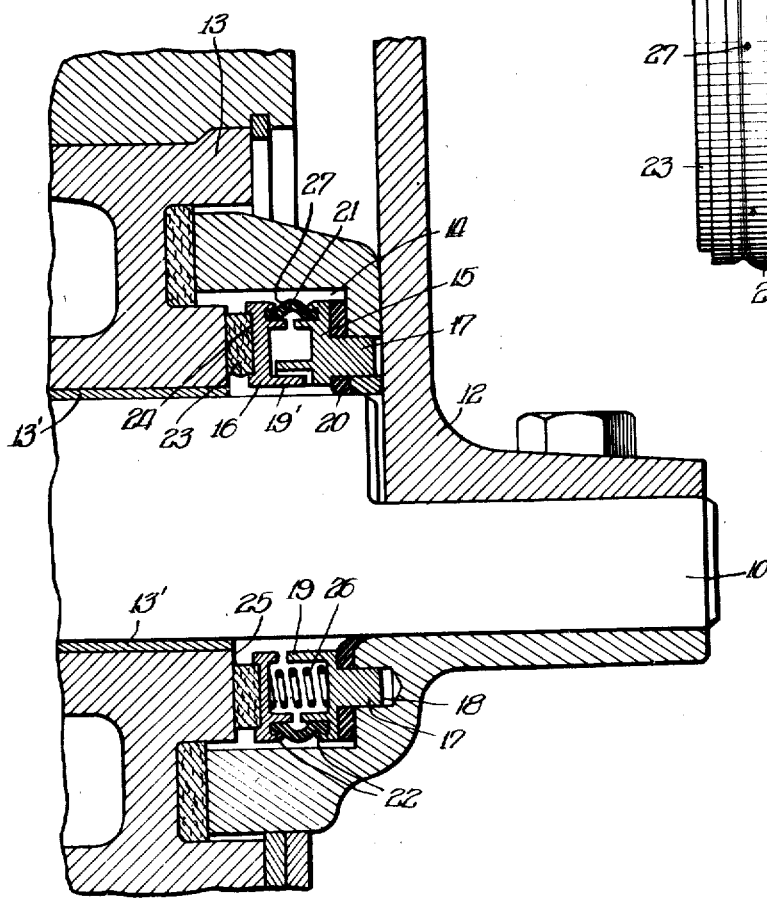
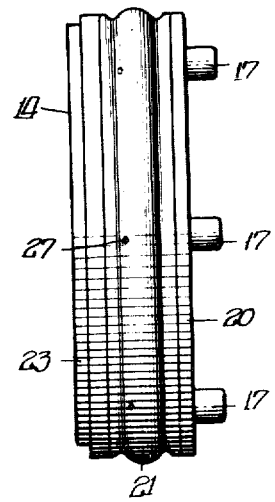
INVENTOR.
Rudolph J. Vedovell,
BY
Cromwell, Greist & Warden Patented Dec. 13, 1949

2,491,233

UNITED STATES PATENT OFFICE 2,491,233

SEAL

Rudolph J. Vedovell, Kenilworth, Ill., assignor to Chicago Rawhide Manufacturing Company, Chicago, Ill., a corporation of Illinois Application January 19, 1946, Serial No. 642,229

2 Claims. (Cl. 286—11)

This invention relates to improvements in an oil seal of the sleeve diaphragm type, it being a particular object of the invention to provide a seal having safety provisions for relieving excessive pressure on one radial side of the diaphragm and thereby preventing rupture or displacement thereof under certain circumstances.

A further object is to provide a seal of this type which is of simplified and economical construction and improved operation.

Other more specific objects and advantages of the invention will be apparent to those skilled in the art upon a full understanding of the improved structure herein described.

In the drawings,

Fig. 1 is a fragmentary view in longitudinal vertical section illustrating a seal in accordance with the present invention in operative position relative to a shaft and associated housing and other members; and Fig. 2 is a view in side elevation of the seal, further illustrating the provisions of the invention.

In the operation of certain diaphragm type oil seals in association with grease-lubricated bearings, bushings or the like, it frequently occurs that when grease is applied by a grease gun under high pressure the diaphragm of the seal will blow out or rupture, being subjected internally to full force of the lubricant. The present invention provides a diaphragm type oil seal, exemplified in an end thrust or face seal embodiment, having safety provisions entirely eliminating this source of trouble.

Referring to Fig. 1 of the drawings, wherein an illustrative application of the seal is shown, the reference numeral 10 designates a fixed shaft or spindle secured at its ends in a housing 12, on which shaft the rotatable member 13 is journaled by a bearing member or bushing 13'. This member may be regarded as a rotary hub or any other conventional rotary element. The reference numeral 14 generally designates the seal of the invention which comprises a pair of axially spaced annular supporting ring members 15, 16, the former being provided with axially extending lugs 17 which are receivable in recesses 18 in the fixed housing 12 to prevent rotation of the seal relative to the housing. To the same end, members 15, 16 are provided with alternating, axially projecting tongues or lugs 19, 19', or equivalent means of the type illustrated in my earlier Patent No. 2,287,207, of June 23, 1942, which are interleaved with one another in a manner to prevent relative rotation of the members 15, 16, as will be understood.

A shaft engaging washer 20 of flexible non-metallic material such as leather, synthetic rubber, or the like, is applied to the outer lateral surface of member 15, being appropriately apertured for engagement over the outwardly extending lugs 17 in the manner shown. This ring constrictively engages the shaft 10 to prevent ingress of dirt or moisture to the shaft bushing or undue loss of lubricant at this point. The coacting members 15, 16 are connected by means of an annular, axially extending or sleeve-like flexible diaphragm 21 of suitable material such as treated fabric, rubber, leather or synthetic rubber, this diaphragm being clamped at opposite axial sides thereof in opposed annular recesses 22 of the members 15, 16. Member 16, on the exposed lateral side thereof, is provided with a face sealing ring 23 of leather, carbon or like material which is disposed in a laterally insert peripheral groove or recess 24 of the member 16, said ring 23 having sealing engagement with the adjacent lateral sealing surface 25 of the rotary member 13. A plurality of circumferentially spaced coil springs 26 disposed internally between the members 15, 16 serve to urge the same axially for effective sealing action and diaphragm 21 is capable of ready flexure in the axial direction to permit this movement.

It has been found in practice that the diaphragm 21 is apt to rupture or blow out when subjected to the relatively high pressure of grease or like lubricant applied to the shaft, when a grease gun or similar mechanical device is used for this purpose. This in turn may lead to serious results due to the incapacity of the seal, and to the end of eliminating this source of inconvenience and loss the diaphragm member 21 is provided with a plurality of small perforations or punctures 27, there being six or more of these relief or bleeder perforations in a practical embodiment. Said perforations serve the purpose of allowing radial outward leakage of the excess grease under the above circumstance. The perforations need only be of size large enough to pass a small portion of the lubricant during the operation of the lubricating gun. Thereafter the diaphragm effectively contains the remainder of the lubricant against loss. However, should there be a sudden axial compression of the seal, the relief perforations 27 will again void sufficient of the lubricant to prevent building up of a sufficiently high pressure to damage the diaphragm.

As to the particular character or form of the perforations or punches 27, these may be of any desired outline, produced either by removing stock in the formation of an aperture, or by merely punching and removing none of the stock, or by slitting in any desired outline. I therefore desire that the term "perforations" as employed in the appended claims be construed in the broadest sense consistent with accomplishing the pressure relieving function for which the perforations are provided.

What I claim is:

1. A seal of the type characterized by a pair of spaced, annular seal members, and an annular flexible diaphragm extending between said members in confining relation to a space therebetween, in which said diaphragm is provided at one or more points with fine perforations of such small size as to permit the diaphragm to retain without appreciable leakage a predetermined fluid pressure in said space while relieving any excessive fluid pressure built up in said space.

2. A seal of the type characterized by a pair of spaced, annular seal members, one having a sealing element thereon, adapted for sealing engagement with an opposed surface, and an annular flexible diaphrgm of tubular sleeve-like shape extending between and secured at its opposite ends to said members in radially confining relation to a space therebetween, in which said diaphragm is provided at one or more points with fine perforations of such small size as to permit the diaphragm to retain without appreciable leakage a predetermined fluid pressure in said space while relieving any excessive fluid pressure built up in said space, said perforations being formed in said diaphragm without removal of the stock thereof.

RUDOLPH J. VEDOVELL.

REFERENCES CITED

The following references are of record in the file of this patent:

UNITED STATES PATENTS

| Number | Name | Date |
|---|---|---|
| 1,865,764 | Keenan | July 5, 1932 |
| 2,243,255 | McDonald | May 27, 1941 |
| 2,287,207 | Vedovell | June 23, 1942 |
| 2,301,723 | Vedovell | Nov. 10, 1942 |